June 5, 1928.
H. R. WEST
1,672,703
INDUCTION VOLTAGE REGULATOR
Filed Sept. 23, 1927    2 Sheets-Sheet 1
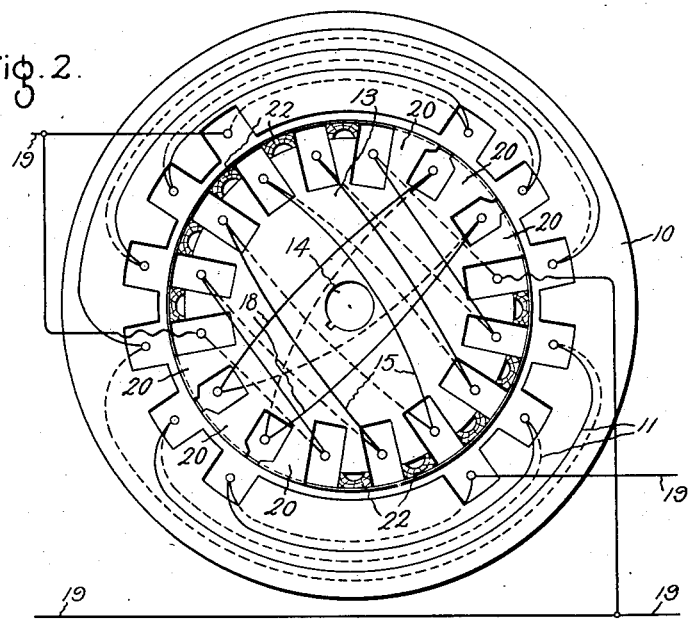
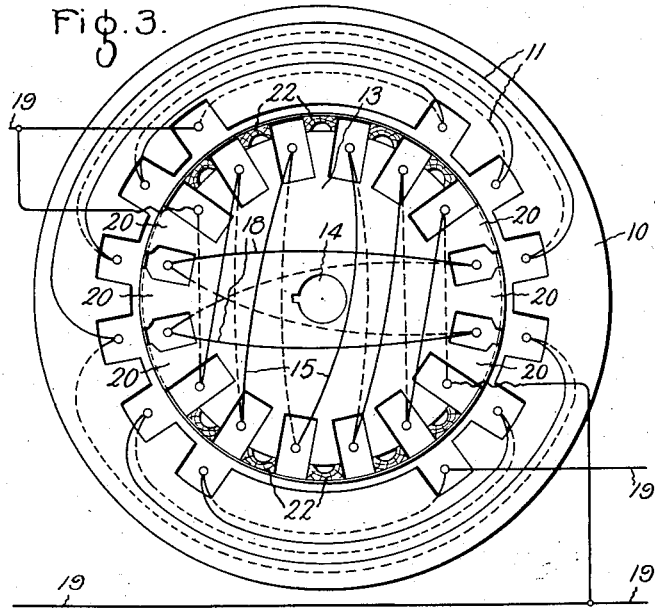
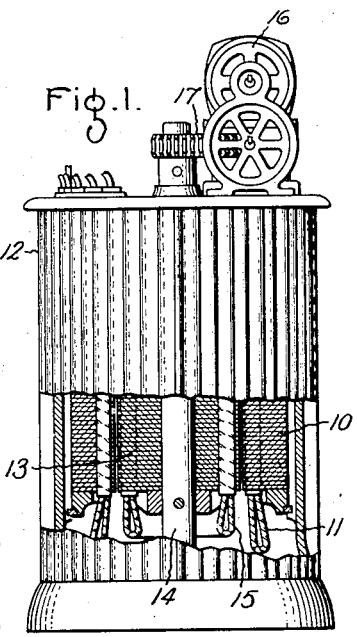
Inventor:
Harry R. West,
by Alexander S. ——
His Attorney.

June 5, 1928. 1,672,703
H. R. WEST
INDUCTION VOLTAGE REGULATOR
Filed Sept. 23, 1927 2 Sheets-Sheet 2

Inventor:
Harry R. West,
by *His Attorney.*

Patented June 5, 1928.

1,672,703

UNITED STATES PATENT OFFICE.

HARRY R. WEST, OF PITTSFIELD, MASSACHUSETTS, ASSIGNOR TO GENERAL ELECTRIC COMPANY, A CORPORATION OF NEW YORK.

INDUCTION VOLTAGE REGULATOR.

Application filed September 23, 1927. Serial No. 221,577.

My invention relates to induction voltage regulators. The general object of the invention is to produce a voltage regulator of this type which shall have improved electrical characteristics, particularly with reference to the impedance of the regulator when connected into a circuit to regulate its voltage. An induction voltage regulator of the type to which the present invention is applicable comprises a hollow cylindrical stationary or stator core member surrounding a cylindrical movable or rotor core member. One of these core members carries a primary or shunt winding which is connected across the circuit in which the voltage is to be regulated. The other core member carries a secondary or series winding which is connected in series with one side of that circuit. For mechanical reasons, the shunt winding is usually carried by the movable rotor core and the series winding by the stator core. The inductive relation between the two windings and therefore the voltage induced in the secondary winding may be varied by changing the position of the rotor core with its winding and in this way the voltage of the circuit on the secondary side of the regulator may be varied or regulated as desired. It is usually desirable that the impedance introduced into a circuit by a regulator be low and that this impedance be as near constant as possible throughout the range of adjustment of the regulator. These results have already been attained to a large extent by an additional short circuited winding carried by the rotor core and disposed in proper inductive relation with the primary and secondary windings. The main object of the present invention is still further to reduce and equalize the losses and impedance of the regulator by an improved arrangement of the primary and secondary windings on the core members and by improvements in the core members themselves.

Figure 4:
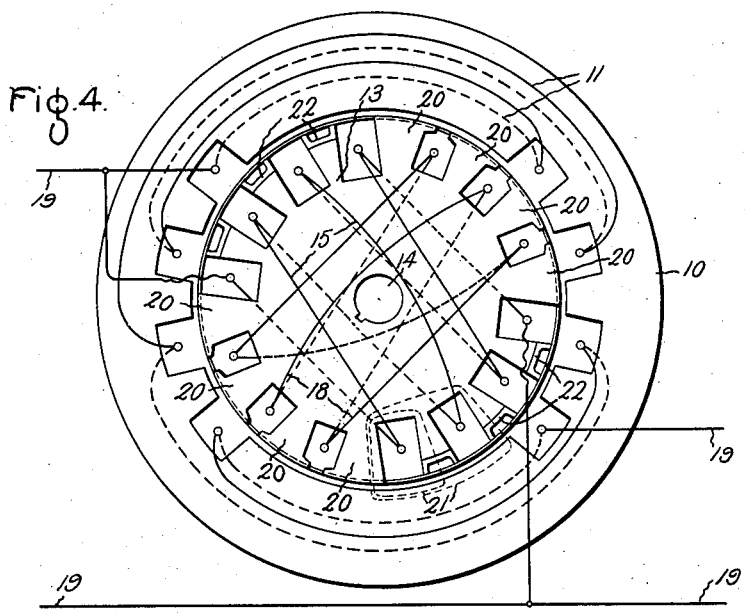
Figure 5:
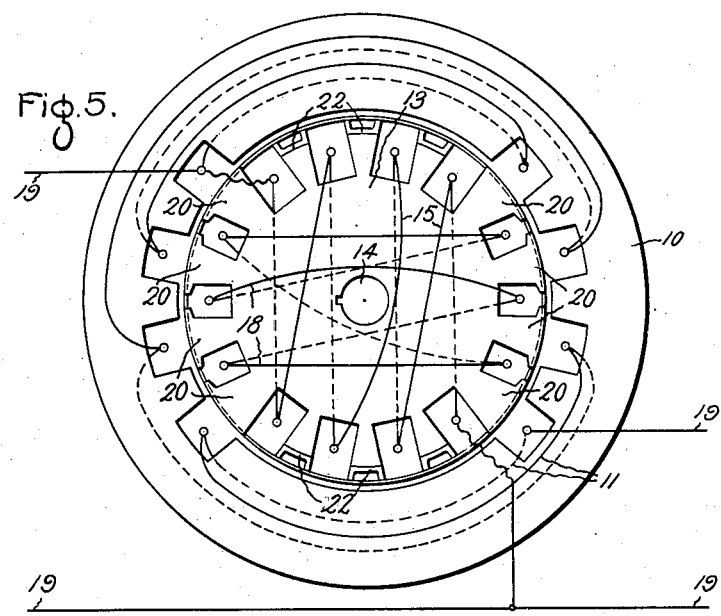

The invention will be better understood from the following description taken in connection with the accompanying drawings in which Fig. 1 is a view, partly in section, of an induction voltage regulator of the type to which the invention is applicable, Fig. 2 is a diagrammatic plan view of a regulator constructed in accordance with the invention, Fig. 3 is a view similar to Fig. 2 but with the rotor of the regulator adjusted to a different position, Fig. 4 is a diagrammatic plan view of a modified form of regulator embodying certain features of the invention, and Fig. 5 is a view similar to Fig. 4 but with the rotor adjusted to a different position.

Like reference characters indicate similar parts in the different figures of the drawings.

The regulator shown in Fig. 1 comprises a stator core 10 carrying a winding 11 and supported in fixed position in a casing 12 which may be filled with oil for insulating and cooling the regulator. The stator core 10 is in the form of a hollow magnetic cylinder surrounding a movable or rotor core 13 mounted on a shaft 14 and carrying a winding 15. The angular position of the rotor core 13 and its winding 15 may be varied or adjusted with respect to the stator core 10 and its winding 11 by a motor 16 and suitable gearing 17. The rotor core 13 also carries a short circuited winding 18 arranged at right angles to the winding 15.

The regulator is connected into a circuit 19 so that the voltage of the section of this circuit at one side of the regulator may be adjusted with respect to the voltage of the section at the other side of the regulator. The shunt or primary winding 15 on the rotor core is connected between the two sides of the circuit 19 and the series or secondary winding 11 on the stator is connected in series with one side of the circuit 19. The primary winding 15 induces a magnetic flux across the rotor core 13, the stator core 10 providing return paths for this flux. The amount and direction of this flux which is linked with the secondary or series winding 11 is dependent upon the angular position of the rotor core 13 and its primary winding 15 and thus an induced voltage in either direction and of any value within the range of the regulator may be added to or subtracted from the voltage of the circuit 19 by properly adjusting the position of the rotor. In Figs. 3 and 5, the primary winding 15 is shown at right angles to the secondary winding 11 so that the flux induced by the primary winding does not induce any voltage in the secondary winding and the voltage of the circuit 19 is not changed. If the primary winding 15 with its core 13 is rotated from this neutral position, however, more and more of the primary flux is linked with the secondary winding 11 until the two windings are parallel to each other when substantially all the primary flux is linked with the secondary winding and a maximum voltage in one direction is induced in the secondary winding. If the primary winding 15 is rotated in the opposite direction from its neutral position, the voltage induced in the secondary winding 11 will be similarly increased from zero to its maximum value but in the opposite direction. In Figs. 2 and 4, the primary winding 15 is shown in an intermediate position and the voltage induced in the secondary winding is of some intermediate value between zero and one of its possible maximum values.

The purpose of the short circuited winding 18 is to reduce the reactance or impedance of the regulator, particularly when the primary winding 15 is at or near its neutral position as shown in Figs. 3 and 5. Under these conditions, the primary and secondary windings are non-inductively related and any current in the circuit 19 would be forced through the secondary winding and tend to induce a magnetic field so that this secondary winding would have a high reactance. The short circuited winding, however, surrounds the path through which the flux of the secondary field would have to flow and thus limits this field and the reactance of the secondary winding to a small value. As the position of the rotor is changed in either direction, the short circuited winding 18 is moved more and more out of this inductive relation to the secondary winding 11 but the primary winding 15 is at the same time moved gradually into inductive relation with the secondary winding so that the reactance of the secondary winding is always limited to a low value either by the short circuited winding or by the primary winding or by the effect of both together.

The primary winding 15 is embedded in longitudinal slots in the surface of the rotor core 13 and the secondary winding is similarly embedded in slots in the inner surface of the stator core 10. These slots leave projecting ridges or teeth between them which serve not only to support the groups of winding turns in the slots but also to provide paths for the magnetic flux between the two core members. Prior to the present invention, the teeth of the rotor core in a regulator have all extended a uniform radial distance from the axis of the rotor, this radial distance being such that the outer faces of the teeth are close to the inner cylindrical surface of the stator. The main magnetic flux induced by the primary winding 15 flows through the rotor core 13, entering through one group of teeth 20 which form one magnetic pole at one side of the rotor and leaving through another group of teeth 20 which form the other magnetic pole at the opposite side of the rotor. Any magnetic flux which leaks out from the rotor core 13 to the stator core between the turns of the primary winding 15 through the interpolar teeth increases the reactance of the primary winding and thus of the secondary winding 11 so that an undesirably high impedance may be offered to the line current in this secondary or series winding. Such leakage flux may follow paths such as are indicated by the broken lines 21 in Fig. 4.

The pole teeth 20 should, of course, extend radially close to the inner surface of the stator core 10 so that the air gaps at the ends of these teeth may be small and offer as little reluctance as possible to the main magnetic flux. If the remaining rotor teeth between the two groups of pole teeth 20 and which project between the primary winding turns are also long, however, and project close to the stator core, it is apparent that they provide paths of low reluctance for the leakage flux which may flow through these teeth. For instance, with the rotor in the position shown in Fig. 4 where it is about midway between its neutral position and one of its positions in which maximum voltage is induced in the secondary winding, half the primary winding is linked by leakage flux paths, the reluctances of which would be low with correspondingly high reactances in the primary and secondary windings if the non-magnetic gaps between the interpolar rotor teeth and the stator core were small. These high impedances are substantially reduced in accordance with the present invention, however, by providing larger non-magnetic gaps between the interpolar rotor teeth and the stator core than between the pole teeth of the rotor and the stator core as indicated in Figs. 2 to 5 inclusive. It is desirable that these interpolar teeth be shortened only enough to provide the necessary reluctances in the leakage flux paths because these teeth are useful as mechanical supports for the rotor winding. In case the teeth are too short to provide proper support for the rotor winding, strips 22 of non-magnetic material may be secured to the outer ends of the teeth. In Figs. 2 and 3, wooden strips are shown with grooves along their inner faces next to the teeth, these grooves forming ducts through which a cooling medium, such as oil, may circulate. In Figs. 4 and 5, supporting strips of high resistance non-magnetic metal such as German silver are shown, these strips also being formed with grooves to permit a circulation of a cooling medium. It is desirable that these metal strips be of high resistance as well as non-magnetic in order to limit to a sufficiently low value the losses that are produced by the eddy currents induced by the leakage flux. The metal supporting strips have the advantage that they act as shields to prevent the flow of magnetic flux between the magnetic rotor teeth and the stator core.

In Figs. 2 and 3, each magnetic pole of the rotor core 13 is considerably narrower than either interpolar section of the stator core 10, this interpolar core section being, of course, the part occupied by one side of the secondary winding 11. In Figs. 4 and 5, the width of each magnetic pole of the rotor is substantially the same as that of either interpolar section of the stator core 10. In a regulator having the combination of narrow rotor poles and short interpolar teeth on the rotor core, it may be shown that the ratio of ampere turns in the short circuit winding to the ampere turns in the secondary or stator winding is approximately equal to the ratio of the width of each rotor pole to the width of each interpolar section of the stator core. These widths may be measured, of course, either as angles or as distances along the gap between the rotor and stator cores. As shown in Figs. 2 and 3, for instance, each rotor pole is about one half as wide as either of the interpolar sections of the stator core so that the ampere turns in the short circuit winding 18 will be only about fifty per cent of the ampere turns in the secondary winding. In this case, however, it may be shown that if the pole teeth 20 and the interpolar teeth of the rotor all extended to the same radial distance from the axis of the rotor so that all the non-magnetic gaps between these teeth and the stator core were equal, then the ratio of the ampere turns in the short circuit winding to the ampere turns in the secondary winding would be increased to about eighty per cent. The advantage of the narrow rotor poles combined with short interpolar rotor teeth, therefore, is that the short circuit winding may be smaller. This leaves more room for the primary and secondary windings so that conductors of larger cross section may be used in these windings for a given magnetic flux and physical size of regulator.

If the width of each rotor pole is equal to the width of each of the interpolar sections of the stator core, as shown in Figs. 4 and 5, then it may be shown that the ampere turns in the short circuit winding will be approximately equal to the ampere turns in the secondary winding regardless of the lengths of the rotor teeth.

To summarize briefly, the advantage gained by shortening the interpolar rotor teeth where the width of each rotor pole is equal to the width of each of the interpolar stator sections is that the reactances of the primary and secondary windings are reduced, particularly when the rotor is at or near a position midway between its neutral position and either of its positions in which maximum voltage is induced in the secondary winding. The advantage gained by shortening the interpolar rotary teeth where the width of each rotor pole is substantially less than each of the interpolar stator sections is not only that the reactances of the primary and secondary windings are reduced but also that the ratio is reduced between the ampere turns in the short circuit winding and the ampere turns in the secondary winding so that conductors of larger cross section may be used in the primary and secondary windings.

The invention has been explained by describing and illustrating certain preferred embodiments thereof but it will be apparent that various changes may be made within the scope of the invention as defined in the appended claims.

What I claim as new and desire to secure by Letters Patent of the United States, is:

1. An induction voltage regulator comprising a rotor core having spaced longitudinal magnetic teeth, a winding disposed in the spaces between said teeth, certain of said teeth forming magnetic poles when the rotor core is magnetized by current in said winding, a hollow stator core surrounding said rotor core and winding and provided with inner longitudinal spaced magnetic teeth, and a winding disposed in the spaces between said stator teeth, the magnetic pole teeth of said rotor core extending radially beyond its interpolar magnetic teeth, whereby greater non-magnetic gaps are provided between the stator core and the interpolar magnetic rotor teeth than between the stator core and the magnetic pole teeth of the rotor.

2. An induction voltage regulator comprising a rotor core having spaced longitudinal magnetic teeth, a winding disposed in the spaces between said teeth, certain of said teeth forming magnetic poles when the rotor core is magnetized by current in said winding, a hollow stator core surrounding said rotor core and winding and provided with inner longitudinal spaced magnetic teeth, a winding disposed in the spaces between said stator teeth, the magnetic pole teeth of said rotor core extending radially beyond its interpolar teeth, whereby greater non magnetic gaps are provided between the stator core and the inter-polar magnetic rotor teeth than between the stator core and the magnetic pole teeth of the rotor, and non-magnetic winding supports secured to the outer ends of said interpolar rotor teeth.

3. An induction voltage regulator comprising a rotor core having spaced longitudinal magnetic teeth, a winding in the spaces between said teeth, certain of said teeth forming magnetic poles when the rotor core is magnetized by current in said winding, a short circuited winding in the spaces between said polar teeth, and a hollow stator core surrounding said rotor core and winding and provided with inner longitudinal spaced magnetic teeth, certain of said stator teeth forming magnetic poles when the stator core is magnetized by current in said stator winding, and the width of said magnetic rotor poles being substantially less than the width of the interpolar sections of said stator core.

4. An induction voltage regulator comprising a rotor core having spaced longitudinal magnetic teeth, a winding disposed in the spaces between said teeth, certain of said teeth forming magnetic poles when the rotor core is magnetized by current in said winding, a hollow stator core surounding said rotor core and winding and provided with inner longitudinal spaced magnetic teeth, a winding disposed in the spaces between said stator teeth, certain of said stator teeth forming magnetic poles when the stator core is magnetized by current in the stator winding, the magnetic pole teeth of said rotor core extending radially beyond its interpolar magnetic teeth, whereby greater non-magnetic gaps are provided between the stator core and the interpolar magnetic rotor teeth than between the stator core and the magnetic pole teeth of the rotor, and the width of said magnetic rotor poles being substantially less than the width of the interpolar sections of said stator core.

In witness whereof, I have hereunto set my hand this 21st day of September, 1927.

HARRY R. WEST.